Figure 1:
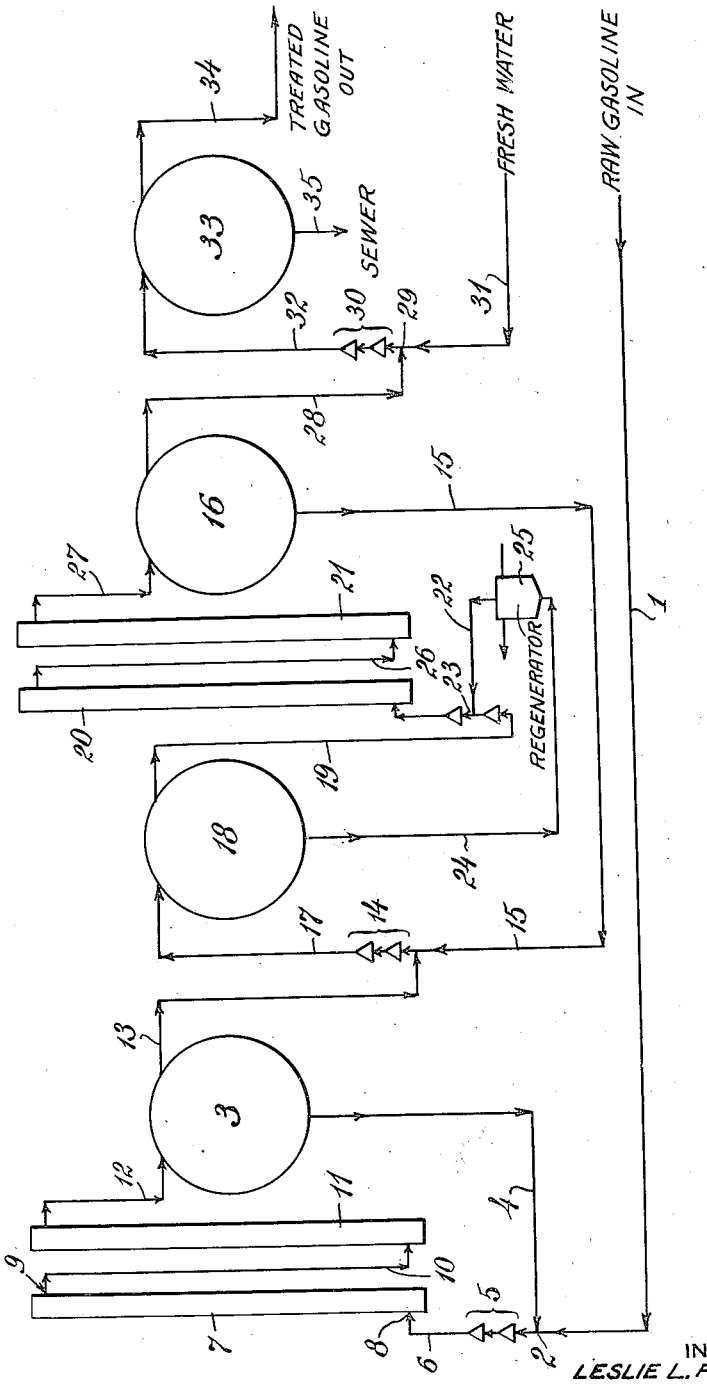

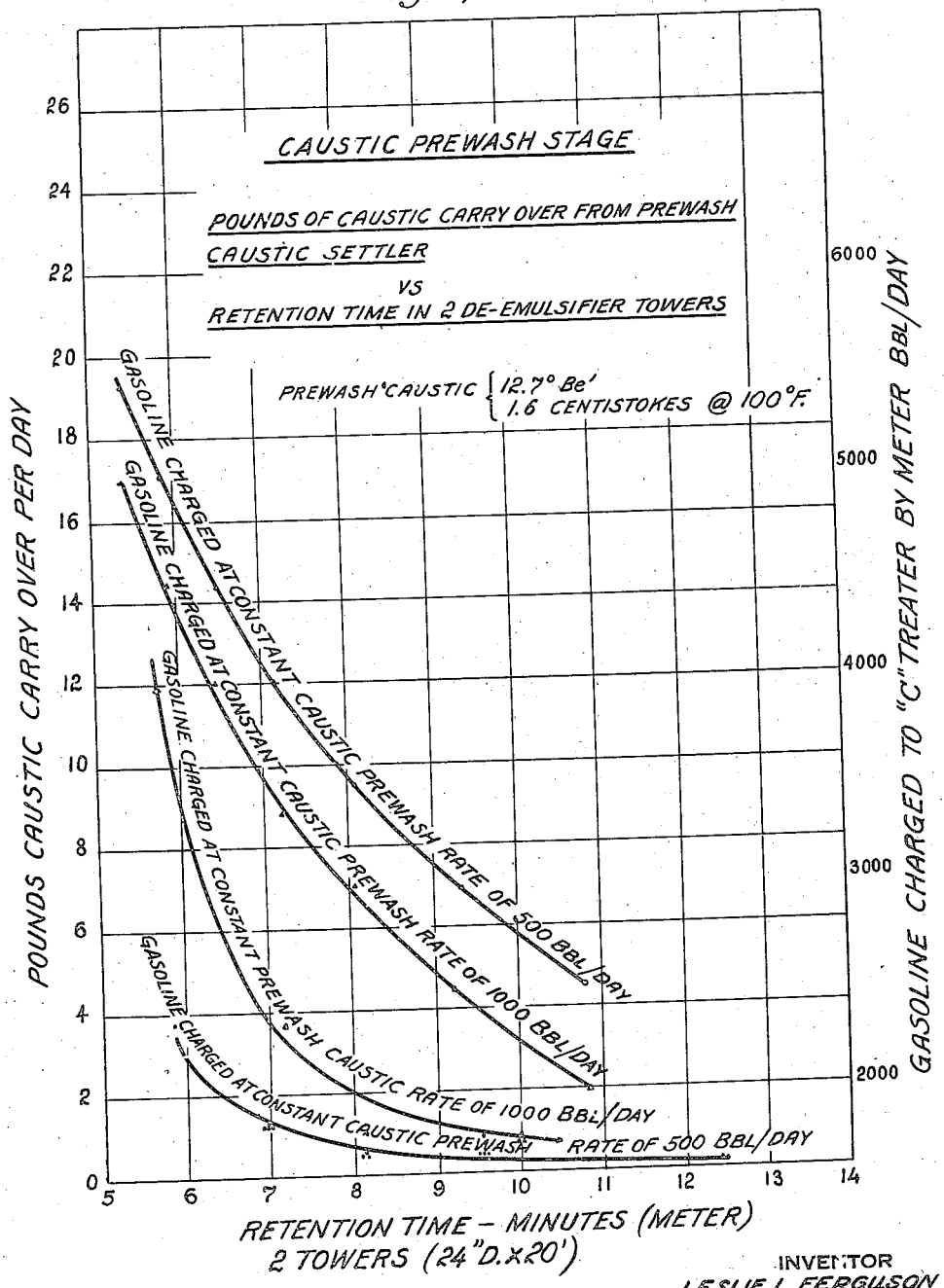

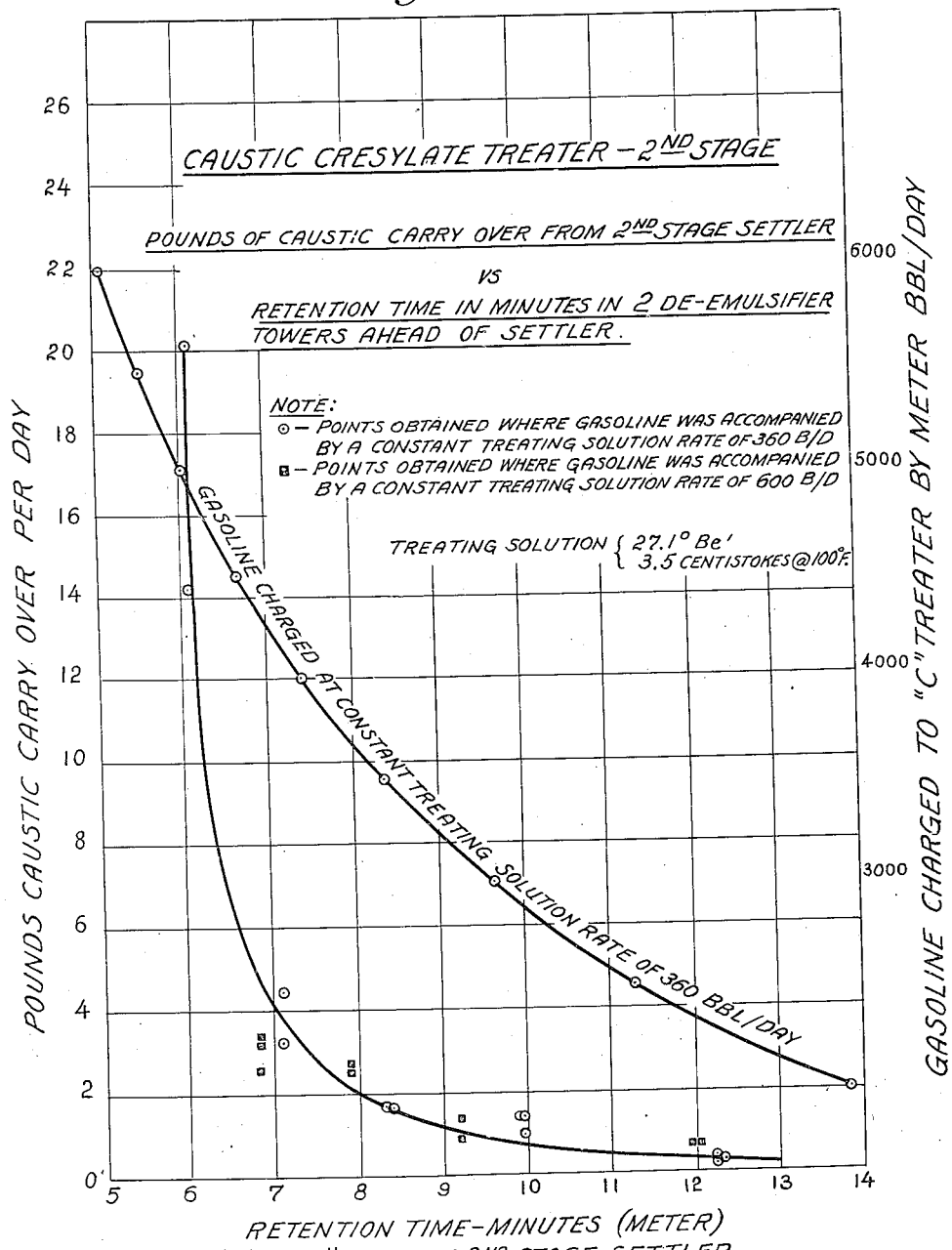

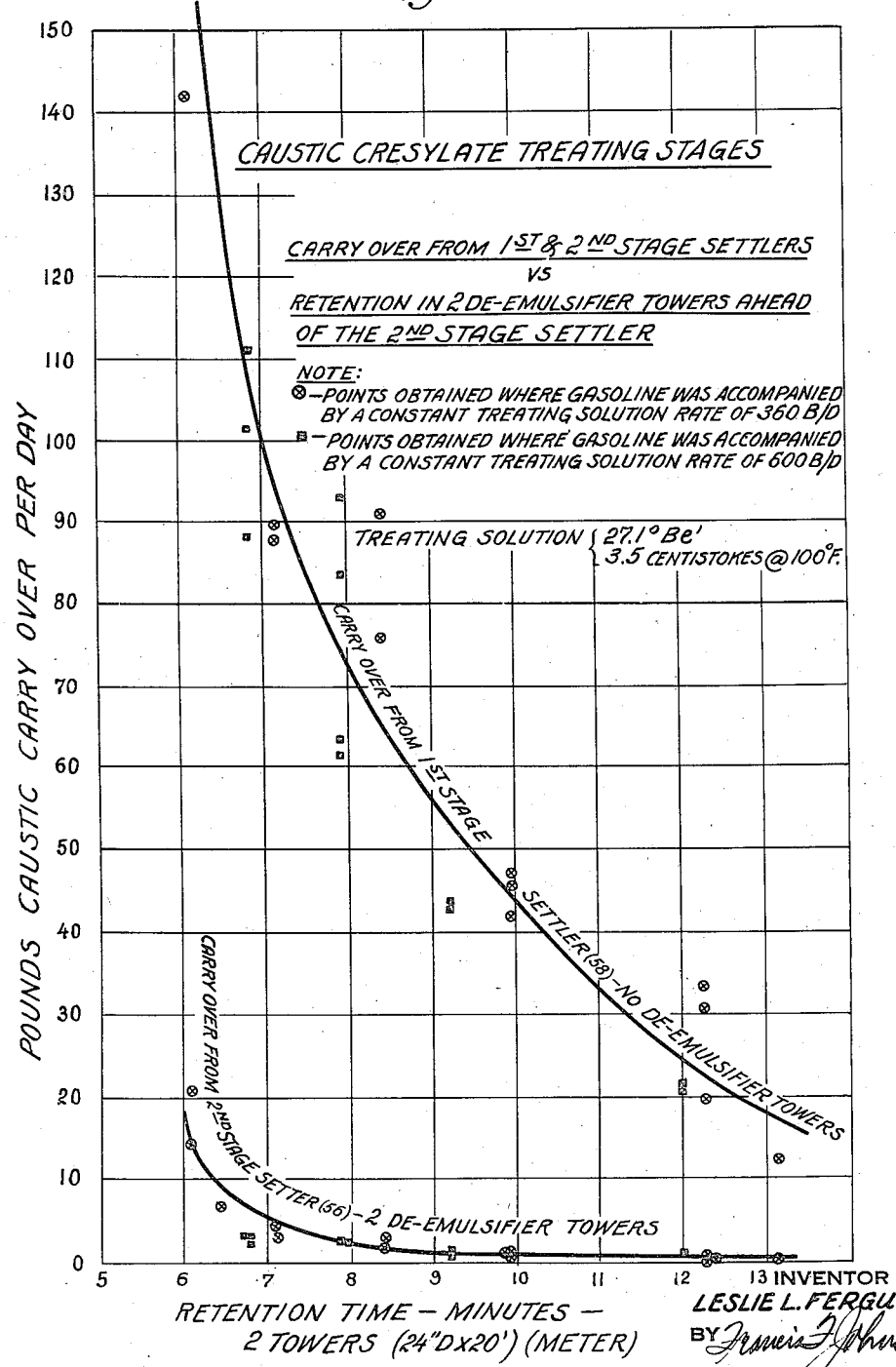

Patented Feb. 22, 1949

2,462,810

UNITED STATES PATENT OFFICE 2,462,810

PROCESS FOR THE SEPARATION OF AN EMULSION OF PETROLEUM OIL AND AQUEOUS SOLUTION CONTAINING ADDED ALKALI METAL SALTS OF CRESOLS

Leslie Lee Ferguson, East St. Louis, Ill., assignor to Socony-Vacuum Oil Company, Incorporated, New York, N. Y., a corporation of New York Application March 20, 1946, Serial No. 655,877

2 Claims. (Cl. 196—30)

The present invention relates to the separation of mixtures of substantially water-immiscible hydrocarbons from aqueous alkaline solutions and, more particularly, to the separation of desulfurized light liquid hydrocarbons, especially petroleum fractions, from aqueous solutions containing alkali metal hydroxide, sulfur compounds and emulsifying agents or emulsifiers.

In the treatment of mixtures of substantially water-immiscible hydrocarbons such at petroleum, and particularly petroleum fractions such as gasoline, almost invariably it is necessary to remove sulfur compounds such as mercaptans. The removal of such sulfur compounds as mercaptains generally is accomplished by contacting the hydrocarbon mixture containing the sulfur compounds such as mercaptans with an aqueous solution containing alkali metal hydroxide. After the aqueous alkaline solution has been in contact with the hydrocarbon mixture and has extracted at least a part of the sulfur compounds to provide a desulfurized mixture of hydrocarbons, it is necessary to separate the desulfurized hydrocarbons from the alkaline solution. This has been done by introducing the mixture of desulfurized hydrocarbons and aqueous alkaline solution into one or more settlers which have usually been in the form of large tanks providing a relatively quiescent zone in which the separation of the hydrocarbon mixture from the aqueous alkaline solution takes place due to the difference in specific gravity of the hydrocarbons and the aqueous solution. Under these conditions the separation of hydrocarbons from alkaline solution is not clear cut. That is to say, the loss of alkali metal hydroxide solution through entrainment in the desulfurized hydrocarbons is substantial. This loss becomes more pronounced with increasing concentration of emulsifying agents such as cresols in the aqueous solution. Several attempts have been made to overcome this difficulty among which may be mentioned the use of a pressure coalescer between the mixing stage and the settling stage and dilution of the aqueous solution.

Each of these attempts to solve the problem has disadvantages. The coalescer is subject to corrosion and dilution sufficient to separate the entrained aqueous solution is the cause of additional expense in concentrating the aqueous solution to an effective concentration of alkali metal hydroxide.

The difficulty in separating desulfurized mixtures of petroleum hydrocarbons from aqueous alkaline solutions is accentuated in those operations in which the lean aqueous extracting solution contains an emulsifying agent such as cresols or alkali metal cresylate. Aqueous solutions containing alkali metal hydroxide and alkali metal cresylate are employed in the removal of mercaptans from liquid light petroleum fractions such as gasoline. As the aqueous solution is recycled and therefore picks up emulsifying material in each cycle, the difficulty is increased.

It has now been discovered that the prior art difficulties encountered in separating desulfurized liquid hydrocarbons from aqueous solution containing alkali metal hydroxide and emulsifying agents can be overcome and alkali carryover in the treated hydrocarbons reduced to a minimum in a simple and efficacious manner involving control of certain factors.

It is an object of the present invention to provide a method for reducing the alkali carryover in desulfurized liquid hydrocarbons after separation from aqueous alkaline desulfurizing solution. It is another object of the present invention to provide a method for reducing the alkali carryover in desulfurized liquid hydrocarbons after separation from aqueous alkaline desulfurizing solution by providing for separation of the mixture into an oil phase of desulfurized liquid hydrocarbons and an aqueous phase containing substantially all of the alkali metal hydroxide in a stream of the mixture flowing at a carefully controlled liquid velocity. Other objects and advantages will become apparent from the following description taken in conjunction with the drawings in which Figure 1 is a more or less diagrammatic flowsheet illustrating the principles of the present invention, Figure 2 is a more or less diagrammatic flowsheet illustrating another embodiment of the principles of the present invention, Figure 3 is a graph illustrating the relation of alkali carryover to residence time for an aqueous alkali metal hydroxide solution of about 13 degrees Baumé, Figure 4 is a graph illustrating the relation between alkali carryover from a second stage settler and residence time for an aqueous solution containing caustic soda and sodium cresylate, and Figure 5 is a graph illustrating the relation between alkali carryover from both settling stages of a 2-stage settling operation and residence time for an aqueous solution containing caustic soda and sodium cresylate having a density of about 27 degrees Baumé.

Figure 2:
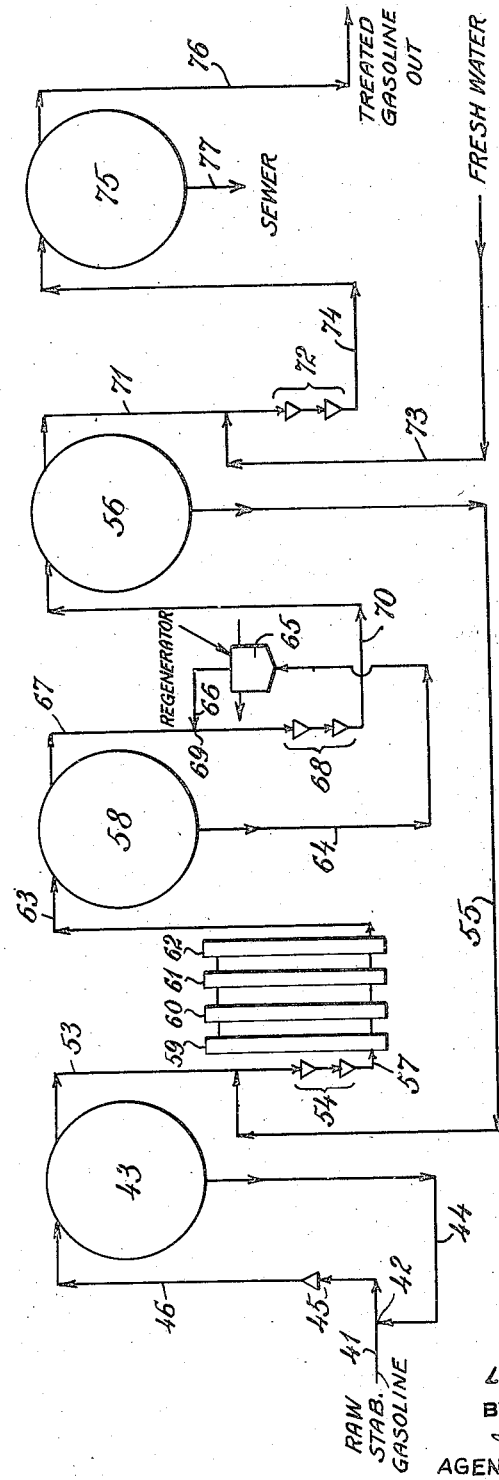

The principles of the operation of the present invention are most easily illustrated by description of the treatment of gasoline to remove mercaptans and the like employing a caustic prewash to remove hydrogen sulfide and $C_1$ to $C_3$ mercaptans and a caustic cresylate solution to remove $C_4$ and heavier mercaptans as illustrated in Figure 1.

Raw gasoline is brought from a source not shown to the desulfurizing operation through line 1. Aqueous caustic soda of about 12 degrees to about 26 degrees Baumé, for example, brought from settler 3 by line 4 is introduced into line 1 at 2 and the two liquids, gasoline and aqueous solution are thoroughly mixed in a mixer 5. Those skilled in the art know that very dilute to very concentrated aqueous solutions of caustic soda may be used in place of solutions of the concentration set forth hereinbefore. Mixer 5 may be a container in which the liquids are mixed by an impeller or a mixing nozzle or an orifice mixer or any other suitable means known to the art. The mixture which is at least in part emulsified passes through line 6 to the de-emulsifying zone.

The de-emulsifying zone is a vertical narrow elongated confined space in which the flow of desulfurized gasoline and aqueous solution is controlled to provide a rate insufficient to overcome the difference in gravity between the gasoline and the aqueous solution. Preferably the de-emulsifying zone takes the form of one or more unpacked towers in which the height is several times, say 10 times, the inside diameter. Furthermore, it is preferred to have the stream of desulfurized hydrocarbons and aqueous alkaline solution flow vertically upward from the point of introduction. The velocity of liquid flow should be such that with a unit volume of de-emulsifying zone the residence time of every portion of the flowing mixture of desulfurized hydrocarbons and aqueous solution containing alkali metal hydroxide, sulfur compounds and emulsifiers is not substantially less than about 6 to about 7 minutes. In other words, the de-emulsifying zone is so proportioned that a residence time in excess of about 6 to about 7 minutes is obtained. This may be expressed in terms of liquid velocity. That is, the de-emulsifying zone is so proportioned that the stream of hydrocarbons and aqueous solution flow through the zone at a velocity of not greater than about 0.10 to about 0.12 foot per second and the stream remains in the zone for not less than about 6 to about 7 minutes.

The mixture of gasoline and aqueous solution is introduced into unpacked tower 7, preferably at point 8, located near the bottom of the tower. The partially de-emulsified mixture leaves tower 7 at a point 9 near the top thereof and passes through line 10 to the bottom of a second narrow elongated vertical unobstructed confined space which may take the form of a tower 11. The de-emulsified mixture of desulfurized gasoline and aqueous alkaline solution leaves tower 11 at an outlet near the top and is transferred to settler 3 through line 12.

Settler 3 in its preferred form is a container having a diameter several times that of the de-emulsifying zone. In the settler, as the name indicates, the aqueous alkaline solution separates from the de-emulsified gasoline by settling. The aqueous solution is withdrawn from the settler 3 as described hereinbefore.

The de-emulsified gasoline is withdrawn from a point near the top of settler 3 and flows through line 13 to a mixer 14. Immediately in advance of mixer 14 caustic cresylate solution is introduced into line 13 from line 15. The aqueous caustic cresylate solution is obtained from settler 16. In mixer 14 which may be of any suitable type, say an orifice mixer, the partially desulfurized gasoline is thoroughly mixed with the aqueous caustic cresylate solution. The mixture flows through conduit 17 to settler 18 where the desulfurized gasoline is separated from the aqueous caustic cresylate solution.

The desulfurized gasoline passes from settler 18 by line 19 to the first of a plurality of unpacked towers, 20 and 21, forming a second narrow elongated vertical de-emulsifying zone. Before entering the second de-emulsifying zone, regenerated caustic cresylate is introduced into line 19 from line 22 and thoroughly mixed therewith in mixer 23.

The regenerated caustic cresylate in line 22 is obtained by withdrawing fat caustic cresylate solution from settler 18 through line 24. The fat caustic cresylate solution flows into regenerator 25 wherein the solution is regenerated by any suitable means such as oxidation, steaming, etc.

The mixture of gasoline and caustic cresylate solution flows through the second de-emulsifying zone (towers 20 and 21 and conduit 26) at a velocity not greater than about 0.1 to about 0.12 foot per second and the zone is so proportioned as to provide a residence time of not less than about 6 to about 7 minutes. The de-emulsified desulfurized gasoline and caustic cresylate mixture leaves the second de-emulsifying zone through conduit 27 and flows to settler 16.

De-emulsified gasoline flows from the top of settler 16 through line 28. At a point 29 in line 28 somewhat in advance of mixer 30 fresh water from a source not shown is introduced into line 28 from line 31. After being thoroughly mixed with the fresh water in mixer 30, the mixture flows through line 32 to settler 33. In settler 33 the desulfurized gasoline is separated from the wash water. The treated gasoline flows from settler 33 through line 34 to storage while the contaminated wash water flows out through line 35.

Figure 2 illustrates another embodiment of the present invention; there is but one de-emulsifying zone located between settlers 43 and 58. That is to say, there is no de-emulsifying zone ahead of the first settler.

Raw gasoline from a source not shown is brought to the treating operation through pipe 41. Aqueous caustic solution flows from settler 43 through line 44 and is introduced into line 41 at a point 42 in advance of the mixer 45. The mixture of gasoline and aqueous caustic flows through line 46 to settler 43. The partially desulfurized gasoline flows through pipe 53 to mixer 54. Somewhat in advance of mixer 54 aqueous caustic cresylate flowing from settler 56 through pipe 55 is introduced into line 53. The mixture of gasoline and caustic cresylate flows through pipe 57 to the vertical unobstructed narrow elongated de-emulsifying zone which may be in the form of towers 59, 60, 61 and 62. The rate of flow is about 0.1 to about 0.12 foot per second and the zone is proportioned to provide a residence time of about 6 to about 7 minutes.

The de-emulsified mixture of partially desulfurized gasoline and caustic cresylate flows through line 63 to settler 58. Caustic cresylate solution is withdrawn from the bottom through pipe 64 and flows to regenerator 65. In regenerator 65 the caustic cresylate solution is regenerated by oxidation, steaming, etc. and the regenerated solution withdrawn through line 66.

The partially desulfurized gasoline passes from settler 58 through line 67 to mixer 68. In advance of mixer 68 at some point such as 69 regenerated caustic cresylate is introduced into line 67. From mixer 68, which may be of a suitable type such as an orifice mixer or nozzle mixer or the like, the mixture of partially desulfurized gasoline and caustic cresylate passes through line 70 to settler 56. In settler 56 the de-emulsified, desulfurized gasoline is separated from the aqueous caustic cresylate solution. The treated de-emulsified gasoline flows through conduit 71 to mixer 72. In advance of mixer 72 fresh water is introduced into line 71 by means of pipe 73. The mixture of desulfurized, de-emulsified gasoline and wash water flows through 74 to settler 75. In settler 75 the treated gasoline separates from the wash water. The treated gasoline leaves settler 75 through pipe 76. The wash water leaves settler 75 through line 77.

Returning now to settler 56, the aqueous caustic cresylate solution which is separated from the de-emulsified, desulfurized gasoline in settler 56 is withdrawn from settler 56 through line 55 for the purpose enumerated hereinbefore.

The de-emulsification of the gasoline is very important since alkali carryover causes obstruction of mixing nozzles and refinery sewers through the formation of precipitates. In addition, the cresylic acid losses prevent concentrating to the desired 15 to 20 per cent concentration and weaker solutions reduce the effectiveness of the mercaptan removal.

A study of the effect of residence time or liquid velocity has shown that this factor must be carefully controlled to a residence time not less than about 6 to about 7 minutes or a liquid velocity of not greater than about 0.1 to about 0.12 foot per second. This is shown by the data in Table I and the curves in Figures 3 and 4.

Table I

| Gasoline Charge, Bbl./Day | Retention Time, Minutes, Caustic Prewash | Carryover NaOH, Lbs./Day |
|---|---|---|
| 2,508 | 8.85 | 0.64 |
| 4,176 | 6.03 | 3.70 |
| 5,556 | 4.8 | 11.94 |
| | Caustic Cresylate | |
| 2,508 | 10.92 | 0.00 |
| 3,480 | 8.27 | 0.88 |
| 5,904 | 5.09 | 14.18 |

When no de-emulsifying zone is used and a unit volume of gasoline is treated per day 49.2 pounds of caustic soda are lost per day from the caustic prewash. When the same volume of gasoline is treated but a de-emulsifying zone and carefully controlled residence time are employed, the caustic soda loss is reduced to 6.4 pounds per day or a reduction in the loss of caustic soda of 87 per cent. It is to be noted that the loss of caustic soda is almost proportional to the amount of caustic solution used. Thus, the loss of caustic soda when 500 barrels of caustic soda solution are used is about one-third that when 980 barrels of caustic soda solution are used. This is manifest from an inspection of the data in Table II.

Table II

| Retention Time, Minutes | Caustic Carryover Lbs. NaOH per day with Caustic Circulation of | |
|---|---|---|
| | 500 BPSD | 980 BPSD |
| 5.0 | 3.0 | 9.0 |
| 6.6 | 0.7 | 2.0 |
| 8.3 | 0.25 | 0.8 |

The loss of caustic cresylate solution also is appreciable when no de-emulsifying zone is employed. When no de-emulsifying zone is used the loss of caustic soda is about 89.4 pounds per day. The use of a de-emulsifying zone and carefully controlled residence time reduced the caustic loss to 3.14 pounds per day, a reduction of about 97 per cent.

The data in Table III clearly show that residence time is a critical factor in reducing the loss of caustic carryover.

Table III

| Gasoline, Bbls./Day | Caustic Cresylate, Bbls./Day | Rention Time, Minutes | Caustic Carryover Lbs. NaOH/Day |
|---|---|---|---|
| 2,508 | 360 | 10.91 | 0.00 |
| 3,480 | 360 | 8.30 | 0.88 |
| 4,980 | 360 | 5.87 | 3.14 |
| 5,904 | 360 | 5.10 | 14.18 |

The effect of the rate of circulation of the caustic cresylate solution is demonstrated by the data in Table IV. The difference in carryover with different rates of circulation of caustic solution are within experimental error.

Table IV

| Gasoline, Bbls./Day | Caustic Cresylate, Bbls./Day | Retention, Minutes | Caustic Carryover Lbs. NaOH/Hr. |
|---|---|---|---|
| 2,508 | 360 | 11.19 | 0.00 |
| 2,508 | 600 | 10.38 | 0.63 |
| 2,736 | 360 | 10.73 | 0.24 |
| 3,480 | 360 | 8.45 | 1.17 |
| 3,480 | 600 | 7.88 | 1.10 |
| 4,980 | 360 | 6.03 | 3.77 |
| 4,980 | 600 | 5.78 | 2.93 |

It is to be noted that while caustic carryover can be reduced by passing the at least partially emulsified mixture as a single stream through a de-emulsifying zone, caustic carryover is not reduced to a greater extent by breaking the single stream into a number of streams flowing along tortuous paths. That is to say, when the unpacked column is replaced by a column of the same internal dimensions but packed with steel wool, under the same conditions of residence time the caustic carryover was not reduced to the same extent. In other words, the steel wool packing impaired rather than improved the efficiency of the de-emulsifying zone.

Although the present invention has been described and illustrated by reference to specific embodiments thereof in terms of treatment of light petroleum distillate with aqueous caustic solution having a viscosity of 1.6 centistokes and aqueous caustic cresylate having a viscosity of 3.5 centistokes, those skilled in the art will understand that when the viscosity of the aqueous alkaline solution is greater the residence time should also be greater.

I claim:
1. In the separation of an emulsion of petroleum oil and aqueous solution of alkali metal hydroxide containing added alkali metal salts of cresols used to remove mercaptans, said aqueous solution having a viscosity of 3.5 centistokes, the improvement which comprises flowing a mixture of oil, aqueous solution and emulsion upward through a vertical confined space of dimensions such as to provide a residence time therein of at least 7 minutes for said oil, aqueous solution and emulsion at a liquid velocity of 0.08 to about 0.12 foot per second.

2. In the separation of an emulsion of petroleum oil and aqueous solution of alkali metal hydroxide containing added alkali metal salts of cresols used to remove mercaptans, said aqueous solution having a viscosity greater than 3.5 centistokes, the improvement which comprises flowing a mixture of oil, aqueous solution and emulsion upward through a vertical confined space of dimensions such as to provide a residence time therein of at least 7 minutes for said oil, aqueous solution and emulsion at a liquid velocity not greater than 0.08 to about 0.12 foot per second.

LESLIE LEE FERGUSON.

REFERENCES CITED

The following references are of record in the file of this patent:

UNITED STATES PATENTS

| Number | Name | Date |
|---|---|---|
| 1,187,797 | Allan | June 20, 1916 |
| 1,702,313 | Ramage | Feb. 19, 1929 |